July 30, 1957

S. SQUILLER 2,801,110

FLUID-ACTUATED CHUCK

Filed April 1, 1954

INVENTOR.
Samuel Squiller

BY
HIS ATTORNEYS

2,801,110

FLUID-ACTUATED CHUCK

Samuel Squiller, Mount Lebanon Township, Pa.

Application April 1, 1954, Serial No. 420,294

6 Claims. (Cl. 279—43)

This invention relates to a fluid-actuated chuck of improved design and construction. A serious objection to prior chucks is their inability to receive a succession of parts, such as castings or similar parts, and accurately position each at the same depth within the chuck for subsequent operations, such as machining or grinding. This is usually caused by a lack of uniformity in the size of the parts, some being undersize with respect to a standard and still others being oversize.

When an undersize part is inserted in a prior chuck, for example, and the segments of the collet are drawn radially inwardly and axially backwardly of the part to grip it, the collet must move back farther than usual to effect the grip because of the undersize dimensions of the part. As a result, the part is at a greater depth within the chuck than desired. Contrariwise, when the part is oversize, the segments of the collet grip the part before they have been drawn radially inwardly and axially backwardly to their intended position. As a result, the oversize part comes to a stop before reaching the desired depth or extent of travel into the chuck. This misfitting of a part with respect to its desired axial position in a chuck is very objectionable when an accurate machining operation is to be made on the part while so held, particularly when the chuck is one of many on an indexing table.

Another objection to prior chucks is the small travel or amount of radial expansion of the collet segments. Accordingly, the chucks are limited as to the range of part sizes they can accommodate.

My fluid-actuated chuck is free of these faults. The present chuck readily receives undersize, standard size, or oversize parts and accurately positions them all at the same depth within the chuck. My chuck is also of relatively small size so that many of the chucks can be conveniently and accurately aligned as desired on an indexing table for multiple or gang operation of the parts.

I have found that if the collet and its segments are maintained in a fixed position instead of traveling axially with respect to the part to effect a grip, undersize and oversize parts may be readily received and located within the collet at the same position as a part of standard size. To realize this, I provide auxiliary means to move the collet segments inwardly so that they may grip a part. In the preferred embodiment, I provide a large radial travel or expansion for the segments by the use of a lever, thereby enabling them to accommodate a wide range of part sizes.

In one form, the present fluid-actuated chuck includes a single housing having a fixed collet. The collet is brought into firm engagement with a part by the camming action of a lever which urges a collet ring toward the free end of the collet segments. A fluid-actuated cylinder within the housing pivots the lever. Preferably, the housing also contains an adjustable stop which limits the extent of the insertion of a part into the collet and has side openings to pass chips and the like through the housing.

The accompanying drawings illustrate a presently preferred embodiment wherein.

Figure 1:
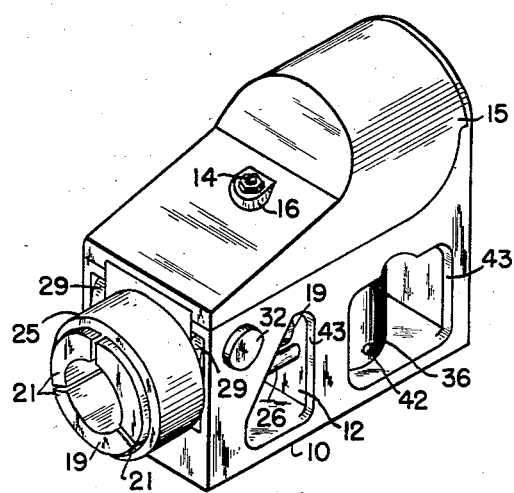
Figure 1 is a perspective view of my fluid-actuated chuck.
Figure 3:
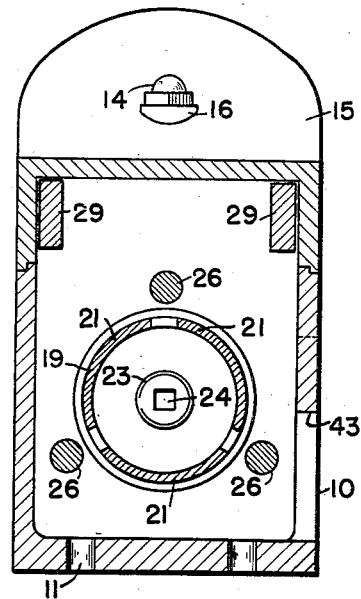
Figure 3 is a section of Figure 2 on the line III—III.
Figure 2:
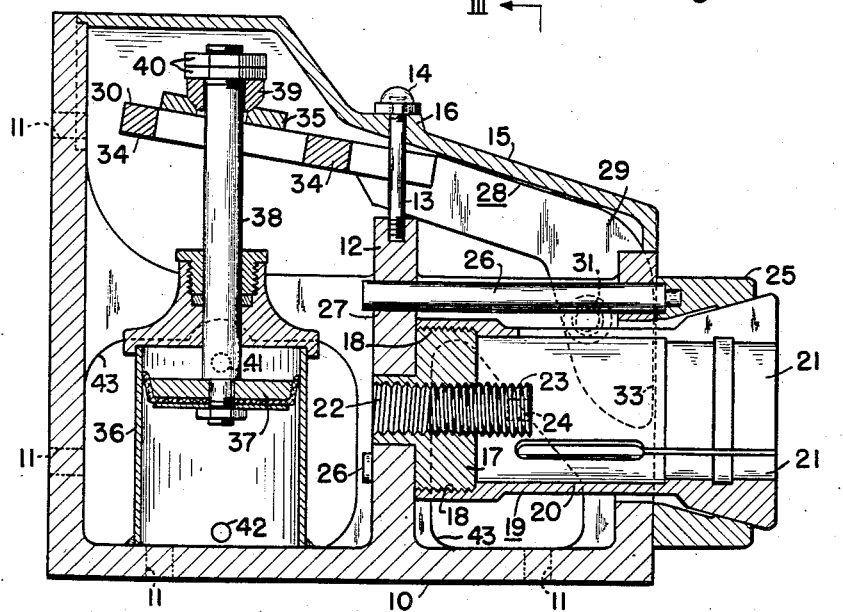
Figure 2 is a longitudinal center section of the chuck.

Referring to the drawings, my chuck includes a stationary housing 10 which may be fixed in either a vertical or horizontal position to a work surface by suitable fasteners passing through holes 11. An inner wall 12 extends substantially in a transverse direction across the housing. A threaded stud 13 and nut 14 secure a cover 15 to the housing by passing through an opening in a boss 16 on the cover and screwing into the top of the wall 12.

A hub 17 secured in the wall 12 has a threaded periphery 18 to engage and fix a collet generally shown at 19 to one side of the wall. The collet includes a tubular member 20 threaded at one end to engage the periphery 18 of the hub. At its other end, the member 20 is slotted to form resilient collet segments 21. Preferably, the hub also has a threaded center bore 22 to receive a threaded adjustable stop 23 which limits the extent to which a part may be inserted in the collet 19. The stop may be adjusted in the bore 22 without removing the collet and accessory parts by a wrench which is inserted in the collet to engage a socket 24 at the end of the stop. A collet ring 25 concentric with the tubular member 20 is free to move axially of the member to force the segments 21 radially inwardly and thereby firmly grasp a part. Pins 26 fixed to the ring 25, approximately 120 degrees apart, pass through openings 27 in the wall 12 to guide the ring during its axial movement.

A lever generally shown at 28 having forked legs 29 and a head portion 30 is mounted in the sides of the housing 10 and pivots on pins 31 carried in sockets 32. The wall 12 has recesses at each of its upper corners to accommodate the legs 29. The legs 29 terminate in camming surfaces 33 which engage the ring 25. The head portion 30 connects the two legs 29 and includes crossarms 34 and a washer 35. Below the head portion 30 and on the other side of the wall 12, there is a fluid-actuated cylinder 36 having a piston 37 and a piston rod 38. The piston rod has a ring 39 backed by lock nuts 40 which seats against the washer 35. Threaded openings 41 and 42 receive pipes for admitting a fluid to the cylinder 36 on opposite sides of the piston 37. Preferably, the housing 10 has side openings 43 which pass chips and the like from the part held in the chuck through the housing. Otherwise, the accumulation of chips in the housing might interfere with continuous use of the chuck over a period of time.

When it is desired to use the chuck for drilling, reaming, threading, or the like, of parts, a suitable part is inserted in the collet 19. The camming surfaces 33 of the legs 29 provide a large radial travel for the segments 21 so that a wide range of part sizes may be accommodated. The stop 23 may be adjusted at this time to limit the extent of the insertion and place each part at the same position within the collet or to protect machined areas of the part from the action of the segments 21. A fluid such as air is then admitted to the cylinder 36 through the opening 41 by conventional means, and the piston 37 is forced downward. The ring 39 bears against the washer 35 to pivot the lever 28 about the pins 31. The camming surfaces 33 of the legs 29 slide across the inner surface of the ring 25 and force it outwardly along the segments 21. The ring, in turn, urges the segments 21 radially inwardly to firmly engage the part. Regardless of whether the part is undersize or oversize, it remains in the same position within the chuck as the segments effect a grip. When the part is to be removed from the chuck, the fluid in cylinder 36 is allowed to escape out the opening 41, or if fast action is desired, fluid enters the cylinder through opening 42 to raise the piston 37 quickly. The natural resiliency in the compressed segments 21 forces the ring 25 sufficiently back toward the housing 10 to allow the part to be easily withdrawn from the collet.

While the foregoing disclosure describes a presently preferred embodiment, it is understood that the invention may be practiced in other forms within the scope of the following claims.

I claim:

1. A chuck including a collet having a tubular rear portion for attachment to a support and having segments at the forward end, a ring substantially concentric with the collet and adapted to move forwardly thereon to urge the segments inward, and a lever having a pivotal mounting in the space between the plane of attachment of the collet to the support and the plane of the ring about the collet and having legs with cam extensions beside the mounting pivot and terminating in camming surfaces directly engaging the ring to effect its movement, whereby the camming surfaces provide a fast action.

2. A chuck including a housing, a collet fixed at its rearward end with respect to the housing and provided with segments at its forward end, a ring substantially concentric with the collet and adapted to move relatively thereto in an axial direction to urge the segments inward, and a lever and a drive cylinder therefor, said cylinder being arranged transversely to the desired path of axial movement aforesaid and with the driven lever pivotally mounted adjacent the collet and having forked legs extending past the fixed end of the collet and straddling the collet to provide a small, compact unit, said legs terminating in camming surfaces directly engaging the ring to effect its movement whereby the camming surfaces provide a fast action in a direction away from the cylinder.

3. A chuck including a housing, a collet fixed at its rearward end with respect to the housing and provided with segments at its forward end, a ring substantially concentric with the collet and adapted to move relatively thereto in an axial direction to urge the segments inward, means shiftable to guide the ring during said movement, a lever having forked legs pivotally mounted adjacent the collet with the pivot points through the legs intermediate the ends of the collet to provide a small, compact unit, said legs terminating in camming surfaces adapted to engage the ring forward of the fixed collet end and effect its movement whereby the camming surfaces provide a fast action, and means to pivot the lever about the legs as a center.

4. A chuck including a stationary housing, a wall within the housing extending substantially in a transverse direction, a collet comprising an annular member fixed at one end to the wall and adapted to engage a workpiece at the other end, a ring concentric with the collet and adapted to move relatively therewith in an axial direction, a pin fixed to the ring adapted to guide it with respect to the wall, a lever mounted in the housing having camming surfaces to engage the ring and effect said movement whereby the end of the collet adapted to engage a workpiece is compressed radially inwardly, and a fluid-actuated cylinder having a piston rod adapted to pivot the lever.

5. A chuck adapted to receive and hold an article for a subsequent operation including a stationary housing, an inner wall in the housing extending substantially in a transverse direction, a collet comprising a tubular member fixed at one end to the wall and having longitudinal slots at the other end to form segments adapted to engage the article, a ring concentric with the collet adapted to move relatively to the segments in an axial direction to force the segments inwardly and thereby firmly engage the article, pins fixed to the ring, said inner wall having openings to receive the pins whereby the ring is guided during said movement, a forked lever, the legs thereof being mounted at the sides of the housing and having camming surfaces to engage the ring and effect said movement whereby the segments have a relatively large radial travel, and a fluid-actuated cylinder having a piston rod to engage and pivot the forked lever whereby operation of the cylinder causes the collet alternately to engage and release the article.

6. A chuck adapted to receive and hold a succession of parts for a subsequent operation including a housing adapted to be fixed to a work surface, an inner wall in the housing extending substantially in a transverse direction, a collet comprising a tubular member fixed at one end to one side of the wall and having longitudinal slots at the other end to form resilient segments adapted to radially engage a part, a ring concentric with the collet adapted to move relatively to the resilient segments in an axial direction to force the segments radially inwardly and thereby firmly engage a part, pins fixed to the ring and extending therefrom in a coaxial direction, said inner wall having openings to receive the pins whereby the ring is guided during said movement, an adjustable stop mounted in the wall and stationed within the tubular member to limit insertion of a part longitudinally of the member, a lever having forked legs and a head, the legs being mounted at the sides of the housing and straddling the collet, the ends of the legs having camming surfaces to engage the ring and effect said movement whereby the segments have a relatively large radial travel, and a fluid-actuated cylinder in the housing on the other side of the inner wall having a piston rod engageable with the head of the lever whereby operation of the cylinder pivots the lever and causes the fixed collet to engage a part by the action between the ring and camming surfaces so that a succession of the parts may be inserted in the collet and against the stop and be placed at the same depth within the collet regardless of the size of such parts with respect to a standard.

References Cited in the file of this patent

UNITED STATES PATENTS

| 2,338,060 | Redmer | Dec. 28, 1943 |
| 2,396,521 | Mead | Mar. 12, 1946 |
| 2,466,651 | Zager | Apr. 5, 1949 |
| 2,543,857 | Leifer | Mar. 6, 1951 |

FOREIGN PATENTS

| 601,190 | Great Britain | Apr. 29, 1948 |